United States Patent [19]

Sato

[11] Patent Number: 4,867,392
[45] Date of Patent: Sep. 19, 1989

[54] SPEED CHANGING DEVICE FOR A FISHING REEL

[75] Inventor: Jun Sato, Sakai, Japan

[73] Assignee: Shimano Industrial Company Limited, Osaka, Japan

[21] Appl. No.: 179,288

[22] Filed: Apr. 8, 1988

[30] Foreign Application Priority Data

Apr. 11, 1987 [JP] Japan .................................. 62-55025

[51] Int. Cl.⁴ ........................ A01K 89/01; F16H 3/08
[52] U.S. Cl. .................................... 242/255; 74/371;
74/372; 192/48.91; 192/96
[58] Field of Search ................. 192/96, 48.91; 74/371,
74/372; 242/211, 212, 215, 217, 218

[56] References Cited

U.S. PATENT DOCUMENTS

| | | | |
|---|---|---|---|
| 2,150,088 | 3/1939 | White | 242/211 |
| 2,184,149 | 12/1939 | Marr | 242/215 |
| 2,332,481 | 10/1943 | Boor | 242/215 |
| 3,167,272 | 1/1965 | Frode | 242/215 X |
| 4,155,520 | 5/1979 | Klotz | 242/215 |
| 4,648,566 | 3/1987 | Furomoto | 192/96 X |

FOREIGN PATENT DOCUMENTS 1199405 7/1970 United Kingdom ................ 242/215

Primary Examiner—Daniel P. Stodola
Assistant Examiner—Katherine Matecki
Attorney, Agent, or Firm—Stevens, Davis, Miller & Mosher

[57] ABSTRACT

A speed changing device is provided for a fishing reel, which includes a first low speed gear engageable with a second low speed gear, a first high speed gear engageable with a second high speed gear, a shifter for selectively transmitting rotation of a handle shaft to the first low speed gear or the first high speed gear, and a wait mechanism having first and second springs which function so that, when the shifter is hindered from moving during the operation of the operating member, the movement of the shifter is temporarily delayed, and, when the hindrance is eliminated, the shifter automatically engages with the first low speed gear or the first high speed gear.

2 Claims, 2 Drawing Sheets

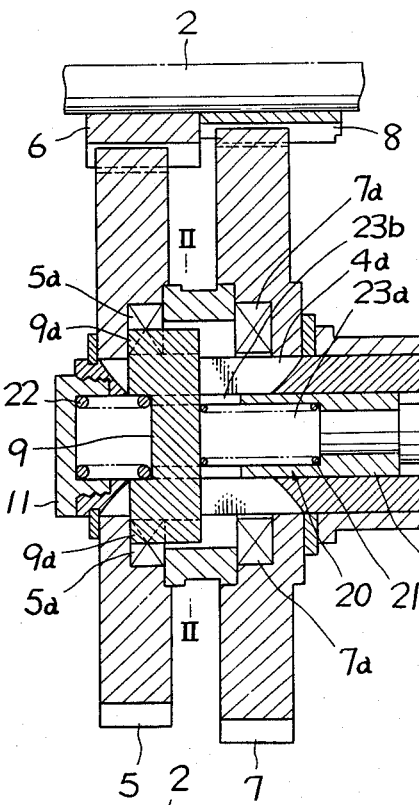
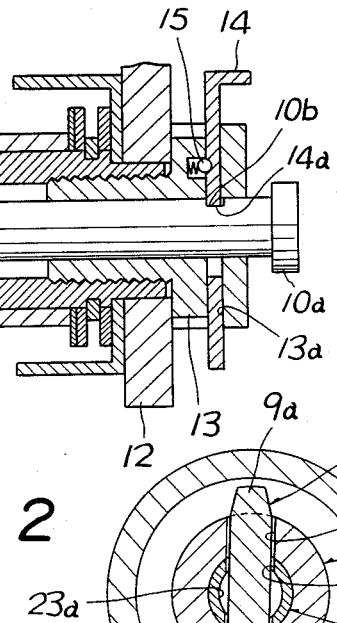
FIG. 1
FIG. 2
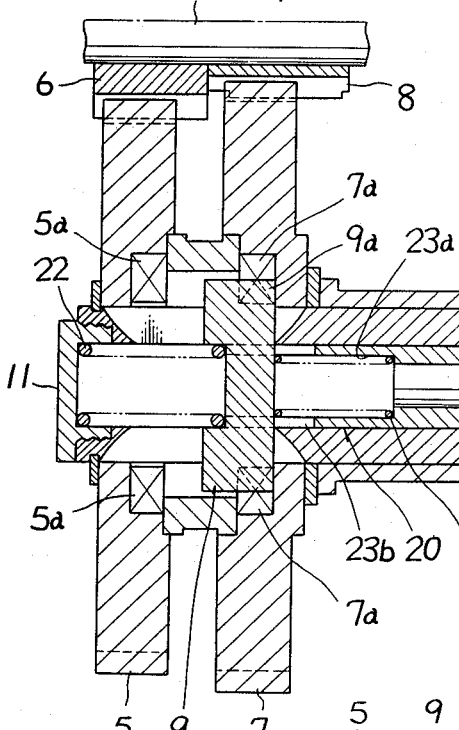
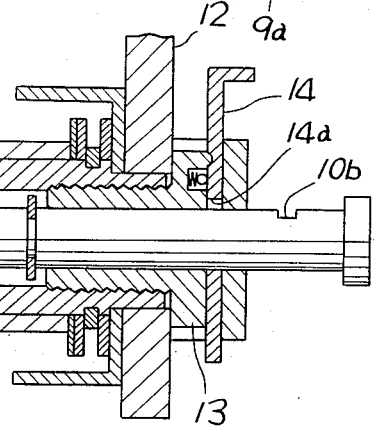
FIG. 5
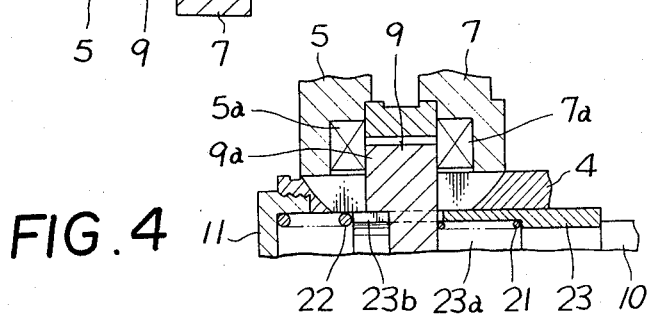
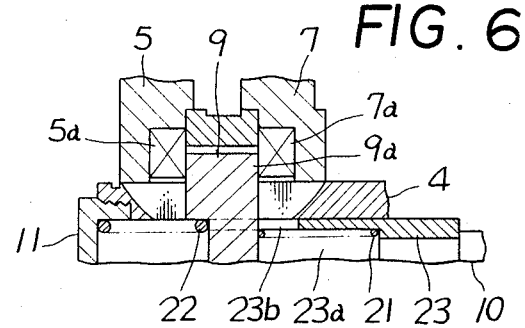
FIG. 4
FIG. 6

SPEED CHANGING DEVICE FOR A FISHING REEL

FIELD OF THE INVENTION

The present invention relates to a fishing reel, and more particularly, to a speed changing device for a fishing reel, which can change the driving speed for a spool of the fishing reel.

BACKGROUND OF THE INVENTION

A conventional fishing reel having a changeable driving speed for a spool has hitherto been well-known.

The conventional fishing reel is provided with a first low speed gear at a handle shaft rotatably supported to a reel body and a second low speed gear and a second high speed gear at a spool, shaft for the spool with the second low speed gear and second high speed gear being axially juxtaposed. Rotatably supported to the reel body is a second high speed gear which is substantially ring-shaped and has at its inner periphery internal teeth engageable with the first low speed gear and at its outer periphery external teeth always engageable with the second high speed gear. The handle shaft is slidably supported to the reel body and is pushed to engage the first low speed gear with the second low speed gear to thereby drive the spool at a low speed. The handle shaft is pulled to engage the first low speed gear with the internal teeth at the first high speed gear, to thereby drive the spool at a high speed.

The conventional fishing reel, which axially pushes or pulls the handle shaft to change the driving speed for the spool as described above, must axially move the handle shaft without rotating, in order to change the speed. Therefore, when each tooth crest at one gear coincides with each tooth bottom at the other gear, the speed change can be carried out without hindrance, but when they do not coincide with each other but both gears abut at lateral sides against each other, the speed change cannot be performed. In such case, in order to change the speed, it is necessary to rotate the handle shaft or the spool so as to mate the tooth crest with the tooth bottom, thereby creating a problem in that the speed change efficiency deteriorates.

SUMMARY OF THE INVENTION

An object of the invention is to provide a speed changing device for a fishing reel, which can perform a speed change for the spool even when the handle shaft is not rotated or a shifter does not coincide with an engaging portion engageable therewith at a low speed gear or a high speed gear while the handle shaft is kept stationary and which can rotate the handle shaft to automatically engage the shifter with the engaging portions at each gear, thereby facilitating and ensuring the driving speed change for the spool.

The speed changing device of the present invention is used for a fishing reel in which the spool and handle shaft are rotatably supported to a reel body. The device is provided around the handle shaft and the axis of rotation of the spool with a set of first and second low speed gears for rotating the spool at low speed and with a set of first and second high speed gears for rotating the same at high speed; between the first low speed gear and the first high speed gear is disposed a shifter which selectively transmits rotation of the handle shaft to the first low speed gear or the first high speed gear. An operating member is provided for actuating the shifter; and a wait mechanism is provided having a first spring whiich transmits the movement of the operating member to the shifter to thereby bias the shifter toward the first low speed gear and a second spring which transmits the movement of the same to the shifter to thereby bias the shifter toward the first high speed gear.

Thus, the operating member is operated to transmit the rotation of the handle shaft to the first low speed gear or the first high speed gear through the shifter, thereby enabling the spool to be rotated at high or low speed. Even when the shifter interferes with the first low speed gear or the first high speed gear not to engage therewith, the operating member can be operated without the necessity to rotate the handle shaft, so that after the operating member is operated the handle shaft is rotated to automatically actuate the shifter by the first or the second spring, thereby ensuring transmission of rotation of the handle shaft to the first low speed gear or the high speed gear.

The above and other objects and novel features of the invention will be more fully apparent from the following detailed description when the same is read in connection with the accompanying drawings.

BRIEF DESCRIPTION OF THE DRAWINGS

FIG. 1 is an enlarged sectional view of an embodiment of a speed changing device for a fishing reel of the invention, showing the principal portion thereof only, FIG. 2 is a sectional view taken along line II—II in FIG. 1, FIGS. 4 through 6 are illustrations of operation of the speed changing device of the invention.

DETAILED DESCRIPTION OF THE INVENTION

Figure 3:
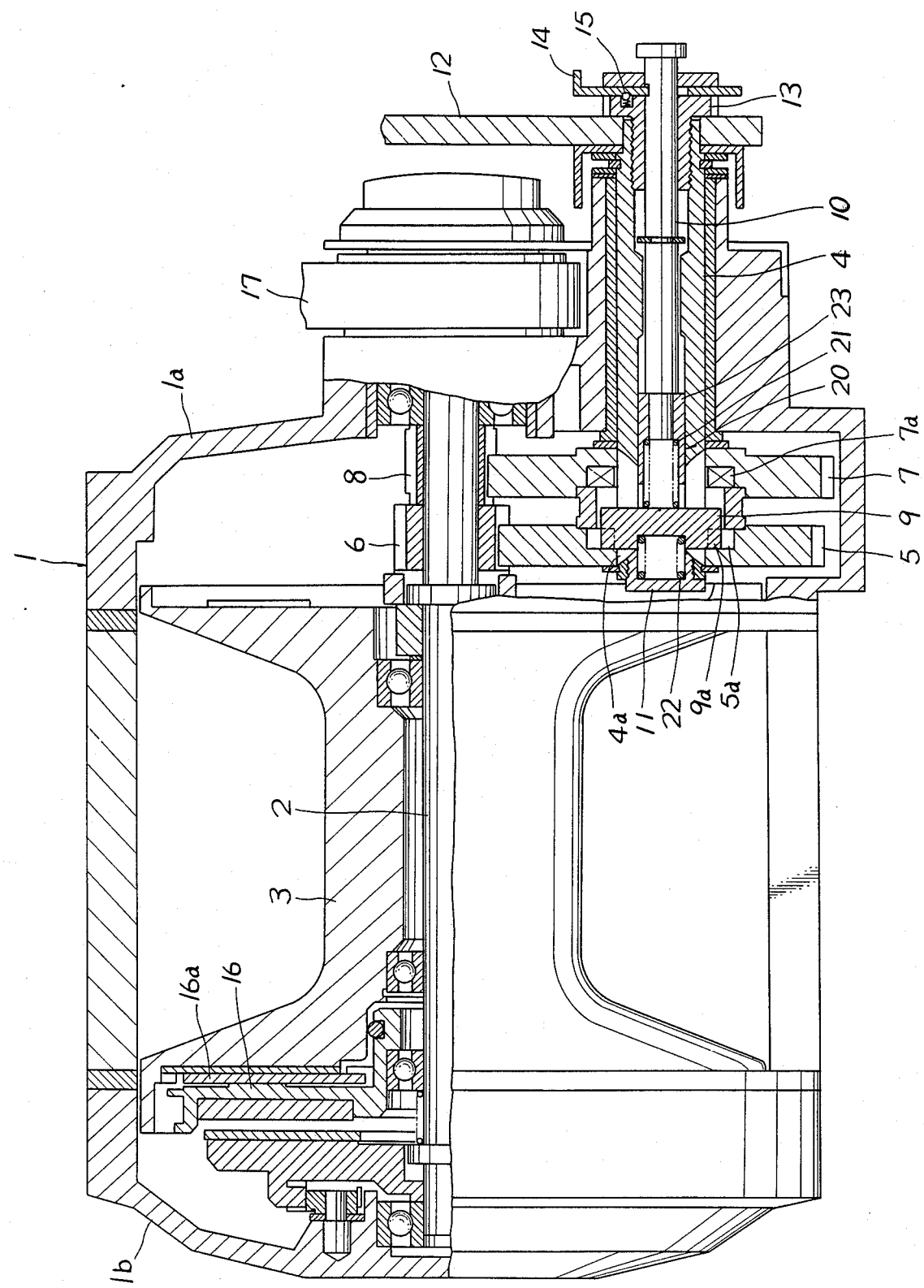
FIG. 3 is a partially cutaway plan view of the entire fishing reel embodying the speed changing device of the invention.

The fishing reel embodying the speed changing device of the invention, as shown in FIG. 3, is constructed such that a reel body 1 is provided with side frames 1a and 1b opposite to each other at a predetermined interval and rotatably supports a spool 3 through a spool shaft 2 and a handle shaft 4 parallel thereto. A set of first and second low speed gears 5 and 6 for rotating the spool 3 at low speed and a set of first and second high speed gears 7 and 8 for rotating the same at high speed are supported to the handle shaft 4 and spool shaft 2 respectively and are axially juxtaposed. A shifter 9, which selectively transmits the rotation of handle shaft 4 to the first low speed gear 5 or the first high speed gear 7, is provided between the handle shaft 4 and the first low speed gear 5 and first high speed gear 7 to undergo sliding and axial movement relative to the handle shaft 4. Also, an operating member 10 for operating the shifter 9 is supported in the handle shaft 4. Between the operating member 10 and the shifter 9 is interposed a first spring 21 which transmits the operation of operating member 10 to the shifter 9 and biases the shifter 9 toward the first low speed gear 5. Between the shifter 9 and a holder 11 fixed to the axial end of the handle shaft 4 is interposed a second spring 22 which biases the shifter 9 toward the first high speed 7 against operation of the operating member 10. First and second springs 21 and 22 constitute a wait mechanism 20.

In the above described construction, the handle shaft 4 is tubular, extends at one axial end into the reel body 1 through a boss 1c of the side frame 1a, is rotatably supported to the boss 1c, and projects at its other axial end outwardly from the reel body 1, so that a handle 12 is mounted on the other axial end through a holder 13 screwing with the handle shaft 4. The one axial end of the handle shaft 4 projecting into the reel body 1 has the first low speed gear 5 and first high speed gear 7 rotatably supported thereon and is provided with a radially perforating slide bore 4a into which the shifter 9 is supported to be able only to slide axially of the handle shaft 4. Rod-like operating member 10 is axially movably supported and the springs 21 and 22 are housed in the axial center bore of the handle shaft 4.

The gears 5 and 7 are provided at their centers with fitting bores to be fitted on the handle shaft 4, at their outer peripheries with a large number of teeth, and at one axial end of the inner peripheries of the fitting bores with engaging portions 5a and 7a respectively. Shifter 9 engages with the engaging portion 5a or 7a to allow the gear 5 or 7 to integrally rotate with the handle shaft 4. In addition, the second low speed gear 6 and second high speed gear 8 are supported to the spool shaft 2 to rotate integrally therewith.

Also, the shifter 9, as shown in FIG. 2, is substantially prism shaped, supported in the slide bore 4a and provided at both lengthwise ends with engaging portions 9a engageable with the respective engaging portions 5a and 7a.

The wait mechanism 20 functions to make the operating member 10 operable even when the shifter 9 is actuated to contact the side surface of the gear 5 or 7 so that the engaging portions 9a do not engage with the engaging portion 5a or 7a. In other words, the wait mechanism 20 delays engagement of the engaging portions 9a with the engaging portion 5a or 7a until the handle shaft 4 rotates, so that, when the handle shaft 4 rotates, a spring force of the first or second spring 21 or 22 automatically moves the shifter 9 to complete the above engagement. In addition, on the utmost end of the operating member 10 is mounted a tubular pusher 23 having the spring 21 and a recess 23a for receiving therein the shifter 9, the pusher 23 being provied at its utmost end with an insertion groove 23b (see FIG. 2) into which the shifter 9 is fitted. The first spring 21 is interposed between the shifter 9 and the pusher 23, and the second spring is interposed between the shifter 9 and the spring holder 11 provided at the axial end of the handle shaft 4, so that the second spring 22 abuts at one end thereof against the utmost end face of the pusher 23. The second spring 22 has a stronger spring force than that of first spring 21 and biases the shifter 9 and operating member 10 rightwardly in FIGS. 1 and 3 so that the engaging portions 9a at the shifter 9 engage with the engaging portion 7a at the first high speed gear 7. The operating member 10 is pushed to deflect the second spring 22 through the pusher 23, so that the first spring 21 biases the shifter 9 toward the first low speed gear 5. At this time, when the engaging portions 9a at the shifter 9 do not engage with, for example, the engaging portion 5a at the first low speed gear 5, the first spring 21 deflects to enable the operating member 10 to be operated. When the spool 3 or handle shaft 4 rotates to allow the engaging portions 9a at the shifter 9 to coincide with the engaging portions 5a at the first low speed gear 5, the first spring 21 biases the shifter 9 to move, whereby the engaging portions 9a engage with the engaging portion 5a. Also, when the operating member 10 is released from its pushing function, the second spring 22 biases the shifter 9 toward the first high speed gear 7. At this time, even when the engaging portions 9a at the shifter 9 do not engage with the engaging portion 7a at the first high speed gear 7, since the shifter 9 is always biased by the second spring 22 toward the first high speed gear 7, the spool 3 or handle shaft 4 rotates to allow the engaging portions 9a and 7a to coincide with each other, whereby the second spring 22 biases the shifter 9 to move and the engaging portions 9a engage with engaging portion 7a.

The holder 13 is provided with a bore 13a into which a holding lever 14 for holding the operating position of the operating member 10 is movably inserted. Holding lever 14 is provided with an elongate slot 14a into which the operating member 10 is inserted. Elongate slot 14a engages at one edge thereof with a retaining portion 10b formed on the operating member 10, thereby maintaining the position of operating member 10 when pushed, in other words, the low speed operating position thereof. In addition, the holder 13 is provided with a maintaining mechanism 15 for maintaining the engagement of the lever 14 with the retaining portion 10b at the operating member 10.

Also, the fishing reel shown in FIG. 3 rotatably supports axially movable spool 3 to the spool shaft 2 and includes between the spool 3 and the spool shaft 2 a drag mechanism 16 having drag members 16a. A drag lever 17 provided at one end of the spool shaft 2 is operated to axially move the spool shaft 2, thereby transmitting a driving force of the second low speed gear 6 or the second high speed gear 8 to the spool 3 through the spool shaft 2 and drag mechanism 16.

In the speed changing device of the invention constructed as described above, when the spool 3 is intended to change its driving stage from the high speed stage shown in FIG. 5 to the low speed stage, the operating member 10 is pushed leftwardly to move the pusher 23 and deflect the second spring 22 abutting against the utmost end of the pusher 23, with the first spring 21 biasing the shifter 9 toward the first low speed gear 5 whereby the engaging portions 9a at the shifter 9 engage with the engaging portion 5a at the first low speed gear 5. Accordingly, the driving force of the handle shaft 4 can be transmitted to the spool 3 through the shifter 9, first and second low speed gears 5 and 6, spool shaft 2 and drag mechanism 16, thereby driving the spool 3 at low speed. At this time, the holding lever 14 is operated to engage at part of its slot 14a with the retaining portion 10b of operating member 10, thereby maintaining the operating member 10 at the low speed operation position.

When the driving stage of spool 3 is changed from the low speed stage as shown in FIGS. 1 and 3 to the high speed stage, the holding lever 14 is operated to release the operating member 10, whereby the second spring 22 biases the shifter 9 and operating member 10 rightwardly in FIGS. 1 and 3 and the engaging portions 9a at the shifter 9 engage with the engaging portion 7a at the first high speed gear 7. Hence, the driving force of the handle shaft 4 can be transmitted to the spool 3 through the shifter 9, first and second high speed gears 7 and 8, spool shaft 2 and drag mechanism 16, thereby driving the spool 3 at high speed.

In a condition where the operating member 10 is pushed and the engaging portions 9a at the shifter 9 do not engage with the engaging portion 5a at the first low speed gear 5, but interfere with the side surface thereof and the shifter 9 is subjected to resistance larger than a predetermined value against operation of the shifter 9 as shown in FIG. 4, the operating member 10 is further pushed to move the pusher 23 and deflect the second spring 22 and also the first spring 21 is deflected, but the shifter 9 remains stationary. When the spool 3 or the handle shaft 4 rotates to allow the engaging portions 9a and 5a to coincide with each other, the first spring 12 biases the shifter 9 toward the first low speed gear 5 to engage the engaging portions 9a with engaging portion 5a.

When the holding lever 14 is operated to release the operating member 10 and the engaging portions 9a at the shifter 9 biased by the second spring 22 do not engage with the engaging portion 7a at the first high speed gear 7, but interfere with the side surface thereof as shown in FIG. 6, the first spring 21 biases the pusher 23 and operating member 10 to move rightwardly in FIG. 6, but the shifter 9 remains stationary. Next, when the spool 3 or the handle shaft 4 rotates and the engaging portions 9a and 7a coincide with each other, the second spring 22 biases the shifter 9 toward the first high speed gear 7, thereby engaging the engaging portion 9a with engaging portion 7a.

Alternatively, the springs 21 and 22 may have equal spring forces so that the operating member 10 may be pushed or pulled, or an operating member for low speed changing and one for high speed changing may be used. Thus, the wait mechanism and operating member are not particularly limited to the structure described and illustrated herein.

Also, the first low speed and high speed gears 5 and 7 may be rotatably supported to, for example, the reel body 1. The second low speed and high speed gears 6 and 8 may be supported at one end of the spool 3.

The shifter 9 may be formed in, for example, a geared form, and is not particularly defined or limited in structure.

Also, the speed changing device of the fishing reel of the invention is applicable not only to a reel provided with no drag mechanism but also to a reel other than a double bearing type reel.

As seen from the above, the speed changing device for the fishing reel of the invention can drive the spool by changing the speed to be high or low. Morevoer, even when resistance against operation is larger than a predetermined value or the handle shaft 4 is stationary, the operating member 10 can be operated, thereby improving its operation efficiency.

While an embodiment of the invention has been shown and described, the invention is not limited to the specific construction thereof, which is merely illustrative in the specification rather than defined or limited.

What is claimed is:

1. A speed changing device for a fishing reel including a spool shaft having a spool and a handle shaft having a handle, said speed changing device comprising:
    a first low speed gear having an engaging portion and a second low speed gear engageable with said first low speed gear,
    a first high gear disposed parallel to said first low speed gear and having an egaging portion and a second high speed gear engageable with said first high speed gear,
    a shifter positioned between said first low speed gear and said first high speed gear and supported to said handle shaft to be movable axially thereof, said shifter transmitting rotational movement of said handle shaft selectively to one of said first low speed gear and said first high speed gear,
    an operating member movably supported to said handle shaft and including an utmost end having a tubular pusher for pushing said shifter,
    a wait mechanism having a first spring interposed between said pusher and said shifter for transmitting pushing motion of said operating member to said shifter to move said shifter toward one of said first low speed gear and said first high speed gear and a second spring having one end abutting against an utmost end face of said pusher, said second spring for biasing said shifter against said pushing motion of said operating member and toward the other of said first low speed gear and said first high speed gear, said second spring having a higher spring force than that of said first spring, and
    a position maintaining means having a first mode for maintaining the position of said operating member after said operating member has pushed said shifter toward said one of said first low speed gear and said first high speed gear and a second mode for releasing said operating member to enable said second spring to bias said shifter toward said other of said first low speed gear and said first high speed gear, whereby when said operating member is operated, said first spring deflects and said second spring deflects due to contact with said pusher to move away from said shifter so as to not bias said shifter and movement of said shifter is delayed until said shifter coincides with said engaging portion of one of said first low speed gear and said first high speed gear.

2. A speed changing device for a fishing reel according to claim 1, wherein said maintaining means is provided with a holder fixed to said handle shaft, a holding lever movably supported to said holder, and an engaging portion provided at said handle shaft and engageable with said holding lever.